United States Patent
Tseng (10) Patent No.: US 10,160,385 B2
(45) Date of Patent: Dec. 25, 2018

(54) VEHICLE REARVIEW MIRROR

(71) Applicant: Wen-Pin Tseng, Changhua County (TW)

(72) Inventor: Wen-Pin Tseng, Changhua County (TW)

( * ) Notice: Subject to any disclaimer, the term of this patent is extended or adjusted under 35 U.S.C. 154(b) by 2 days.

(21) Appl. No.: 15/459,624

(22) Filed: Mar. 15, 2017

(65) Prior Publication Data
US 2018/0265006 A1    Sep. 20, 2018

(51) Int. Cl.
*B60R 1/08*    (2006.01)
*B60R 1/072*   (2006.01)
*B60R 1/12*    (2006.01)

(52) U.S. Cl.
CPC .............. *B60R 1/081* (2013.01); *B60R 1/072* (2013.01); *B60R 1/1207* (2013.01)

(58) Field of Classification Search
CPC ....... B60R 1/081; B60R 1/072; B60R 1/1207; G02B 5/08; G02B 5/0816; G02B 7/182; G02B 7/1827; G02B 7/198
USPC .................. 359/865, 871, 872, 876, 877
See application file for complete search history.

(56) References Cited

U.S. PATENT DOCUMENTS

| | | | | |
|---|---|---|---|---|
| 2,890,539 A * | 6/1959 | Holt | ........................ | B60R 1/02 359/855 |
| 3,909,117 A * | 9/1975 | Takahashi | ................ | B60R 1/10 359/630 |
| 4,678,294 A * | 7/1987 | Van Nostrand | ......... | B60R 1/081 248/483 |
| 4,932,770 A * | 6/1990 | Caravaty | ................ | B60R 1/082 248/467 |
| 5,748,395 A * | 5/1998 | Rendi, Jr. | ............... | B60R 1/008 359/841 |
| 5,949,595 A * | 9/1999 | Kissinger | ................ | B60R 1/081 359/854 |
| 2017/0371155 A1* | 12/2017 | Kamiya | ............. | G02B 27/0101 |

* cited by examiner

*Primary Examiner* — Frank G Font (57) ABSTRACT

A vehicle rearview mirror is mounted in an accommodation casing of a vehicle and contains: an electric direction control assembly, a connection plate, a first reflector lens, and a reflector lens assembly. The electric direction control assembly includes a fixing seat and a movable sheet. The connection plate is disposed on the movable sheet away from the fixing seat and includes a first contacting portion and a coupling portion, the first contacting portion has a first plane away from the electric direction control assembly, and the coupling portion has a second plane away from the electric direction control assembly, wherein the second plane is lower than the first plane. The first reflector lens is secured on the first plane of the first contacting portion, and the reflector lens assembly includes a second contacting portion, a universal connector, and a second reflector lens.

10 Claims, 9 Drawing Sheets

FIG. 9

VEHICLE REARVIEW MIRROR

FIELD OF THE INVENTION

The present invention relates to a vehicle side mirror which contains a first reflector lens flushing with a reflector lens assembly by using a connection plate.

BACKGROUND OF THE INVENTION

A conventional vehicle side mirror is fixed above a front window of a vehicle so as to eliminate blind spot of a driving vision and to avoid traffic accident. The vehicle side mirror manually or electrically controls its rotation angle. For example, a drive mechanism is mounted behind a lens of the vehicle side mirror and includes a reversible DC motor, a reduction gear, and an electromagnetic clutch, such that the driver horizontally adjusts the vehicle side mirror within 30 degrees by using a control switch. Alternatively, a control lever is arranged on the vehicle side mirror and is manually operated by the driver so as to adjust an angle of the vehicle side mirror.

To reduce blind spot of the vehicle side mirror, at least two side lenses are secured on the vehicle side mirror, but such at least two side lenses cannot flush with each other. In addition, tiny objects or dusts block in a gap between the at least two side lenses easily.

The present invention has arisen to mitigate and/or obviate the afore-described disadvantages.

SUMMARY OF THE INVENTION

The primary objective of the present invention is to provide a vehicle side mirror which contains a first reflector lens mounted flush with a reflector lens assembly by using a connection plate.

To obtain the above objective, a vehicle exterior mirror provided by the present invention contains: an electric direction control assembly, a connection plate, a first reflector lens, and a reflector lens assembly.

The electric direction control assembly includes a fixing seat and a movable sheet, and the movable sheet is fixed on the fixing seat and being adjustably rotated to a desired angle.

The connection plate is disposed on one surface of the movable sheet away from the fixing seat, and the connection plate includes a first contacting portion and a coupling portion arranged on one side thereof, the first contacting portion has a first plane formed on one surface of the first contacting portion away from the electric direction control assembly, and the coupling portion has a second plane formed on one surface of the coupling portion away from the electric direction control assembly. The connection plate further includes one surface facing the electric direction control assembly, and the second plane is lower than the first plane.

The first reflector lens is secured on the first plane of the first contacting portion.

The reflector lens assembly includes a second contacting portion, a universal connector, and a second reflector lens, wherein the second contacting portion is connected with the coupling portion of the connection plate by way of the universal connector, the second contacting portion has a third plane formed on one surface thereof away from the coupling portion, and the second reflector lens is fixed on the third plane of the second contacting portion.

In a preferred embodiment, the first contacting portion is integrally injection molded with the coupling portion.

In a preferred embodiment, between the first contacting portion and the coupling portion is defined a stop fringe which connects with the first contacting portion and the coupling portion.

In a preferred embodiment, the stop fringe has a top face formed on one surface thereof away from the electric direction control assembly, the connection plate further includes the one surface facing the electric direction control assembly, and the first plane of the first contacting portion is lower than the top face of the stop fringe.

In a preferred embodiment, the stop fringe has a top face formed on one surface thereof away from the electric direction control assembly, and the stop fringe has multiple light sources exposing outside the top face of the stop fringe.

In a preferred embodiment, each of the multiple light sources is an LED light bulb.

In a preferred embodiment, a projecting angle between each light source and the connection plate is 15 degrees to 45 degrees.

In a preferred embodiment, each lightshade is in a strip shape and covers on the top face of the stop fringe.

In a preferred embodiment, the stop fringe has multiple lightshades mounted on the top face thereof, wherein each of the multiple lightshades is fixed on each light source.

In a preferred embodiment, another electric direction control assembly is arranged on the reflector lens assembly so that the universal connector is electrically driven to adjust an angle of the second reflector lens.

DETAILED DESCRIPTION OF THE PREFERRED EMBODIMENTS

Figure 1:
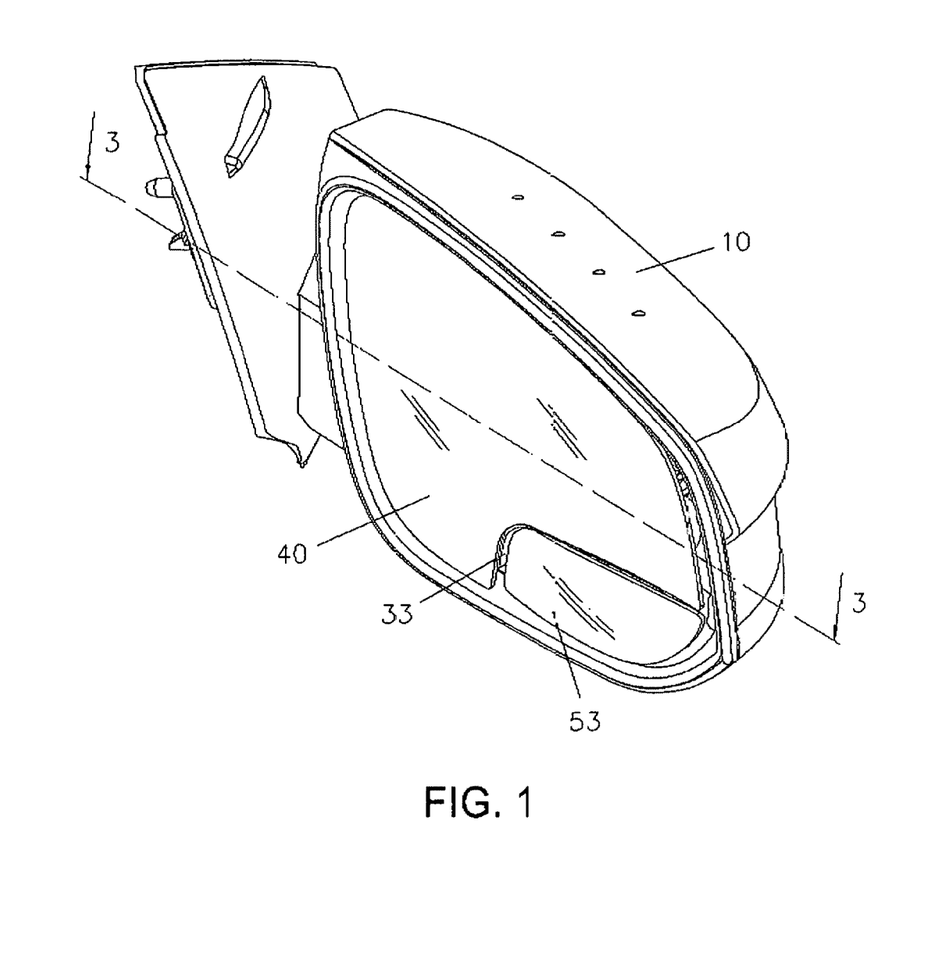
FIG. 1 is a perspective view showing the assembly of a vehicle side mirror according to a first embodiment of the present invention.
Figure 2:
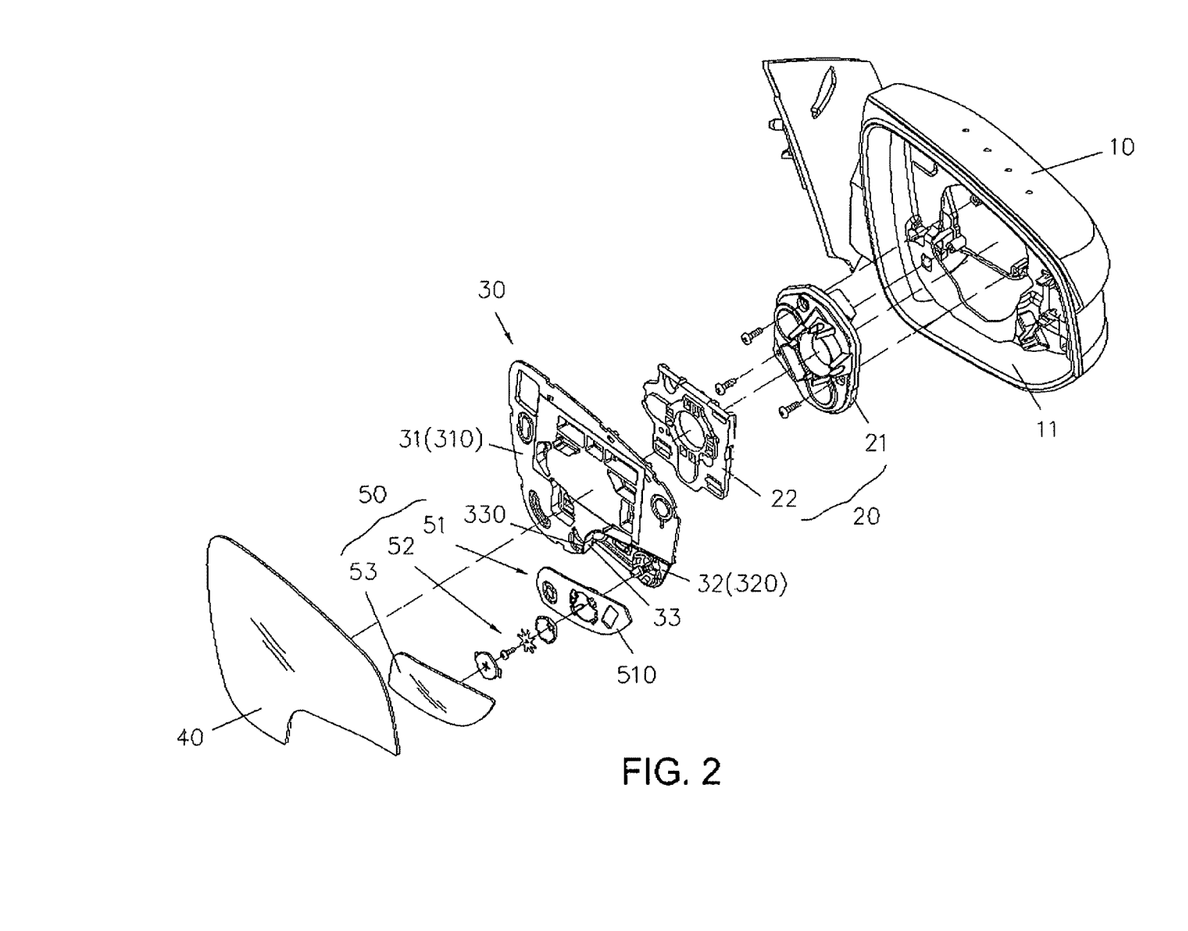
FIG. 2 is a perspective view showing the exploded components of the vehicle side mirror according to the first embodiment of the present invention.
Figure 3:
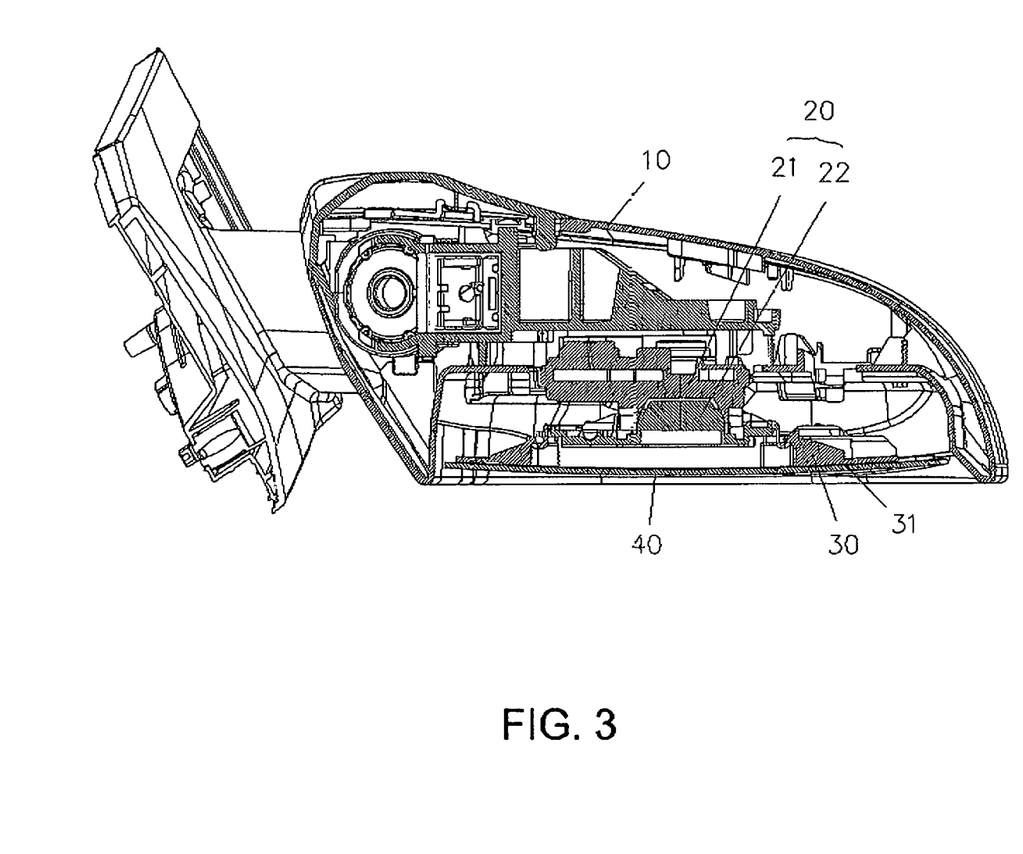
FIG. 3 is a cross sectional view taken along the line 3-3 of FIG. 1.

With reference to FIGS. 1 to 3, a vehicle side mirror according to a first embodiment of the present invention is mounted in an accommodation casing 10 of a vehicle, the accommodation casing 10 includes an opening 11 formed on one surface thereof, and the vehicle side mirror comprises: an electric direction control assembly 20, a connection plate 30, a first reflector lens 40, and a reflector lens assembly 50.

The electric direction control assembly 20 includes a fixing seat 21 and a movable sheet 22, wherein the fixing seat 21 is accommodated in the accommodation casing 10 and has a drive device (not designated number in FIGS. 1-9), and the movable sheet 22 is fixed on the fixing seat 21 and is adjustably rotated to a desired angle by using the drive device of the fixing seat 21.

Figure 4:
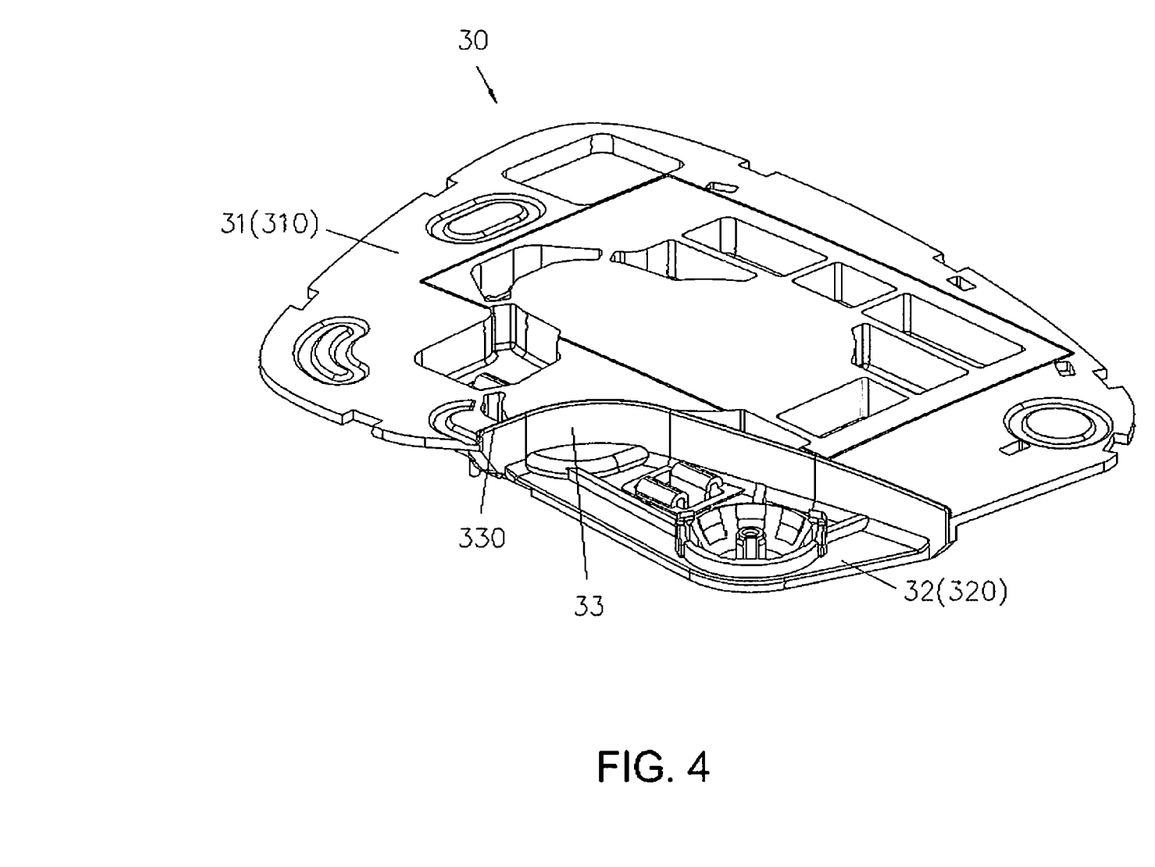
FIG. 4 is a perspective view of a connection plate of the vehicle side mirror according to the first embodiment of the present invention.

Referring further to FIG. 4, the connection plate 30 is disposed on one surface of the movable sheet 22 away from the fixing seat 21, and the connection plate 30 includes a first contacting portion 31 and a coupling portion 32 arranged on one side thereof and integrally injection molded with the first contacting portion 31. In another embodiment, the first contacting portion 31 and the coupling portion 32 are formed independently, and the first contacting portion 31 is in connection with the coupling portion 32. The first contacting portion 31 has a first plane 310 formed on one surface thereof away from the electric direction control assembly 20, and the coupling portion 32 has a second plane 320 formed on one surface thereof away from the electric direction control assembly 20, wherein between the first contacting portion 31 and the coupling portion 32 is defined a stop fringe 33 which connects with the first contacting portion 31 and the coupling portion 32, wherein the stop fringe 33 has a top face 330 formed on one surface thereof away from the electric direction control assembly 20. The connection plate 30 further includes one surface facing the electric direction control assembly 20, and a height between the second plane 320 and the one surface of the connection plate 30 is lower than a height between the first plane 310 and the one surface of the connection plate 30, and the height between the first plane 310 and the one surface of the connection plate 30 is lower than a height between the top face 330 and the one surface of the connection plate 30, i.e., the top face 330 is higher than the first plane 310 and the second plane 320, and the first plane 310 is higher than the second plane 320.

The first reflector lens 40 is secured on the first plane 310 of the first contacting portion 31.

Figure 5:
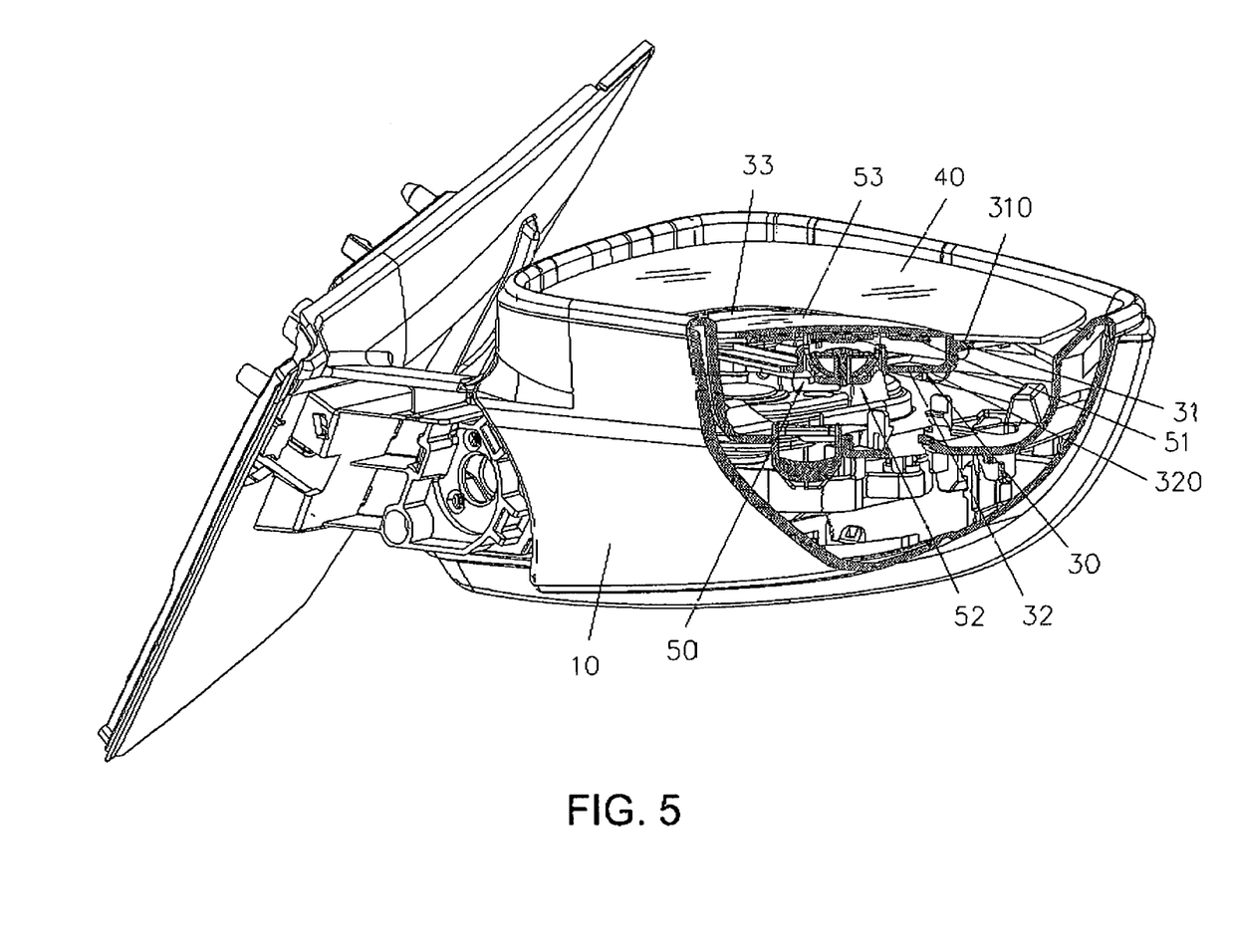
FIG. 5 is a perspective cross-sectional view of a part of the vehicle side according to the first embodiment of the present invention.

As shown in FIG. 5, the reflector lens assembly 50 includes a second contacting portion 51, a universal connector 52, and a second reflector lens 53, wherein the second contacting portion 51 is connected with the coupling portion 32 of the connection plate 30 by way of the universal connector 52 so that the second contacting portion 51 rotates along the coupling portion 32 of the connection plate 30. Furthermore, the second contacting portion 51 has a third plane 510 formed on one surface thereof away from the coupling portion 32, and the second reflector lens 53 is fixed on the third plane 510 of the second contacting portion 51.

Figure 6:
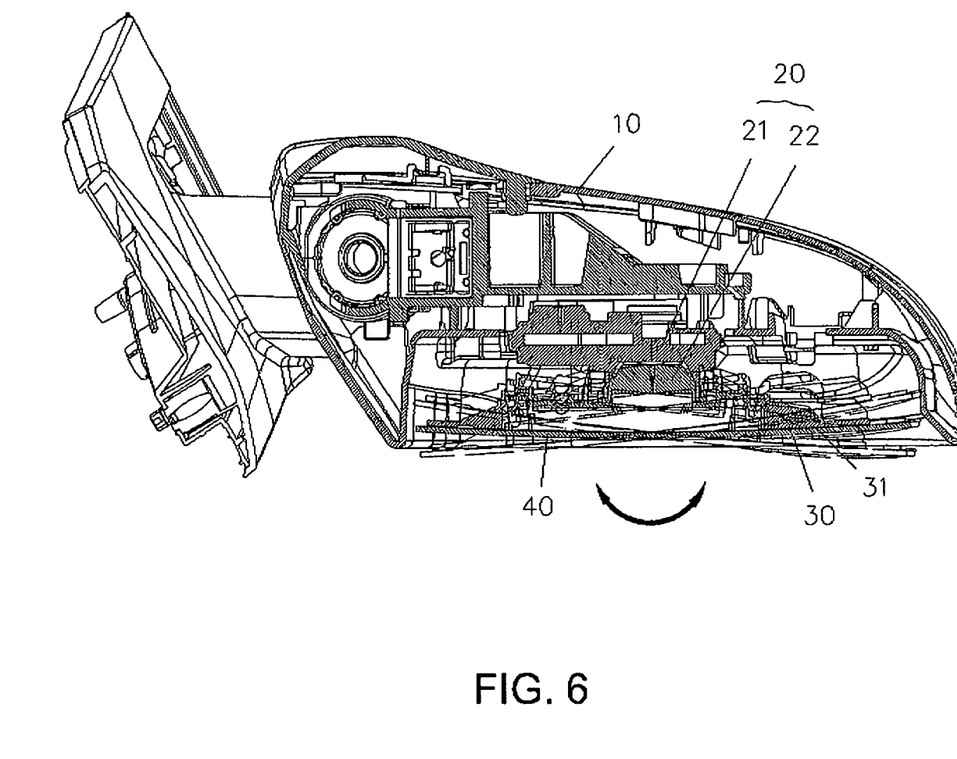
FIG. 6 is a perspective cross-sectional view showing the operation of the side mirror according to the first embodiment of the present invention.

As adjusting the first reflector lens 40 to the desired angle, as illustrated in FIG. 6, the drive device (not designated number in FIGS. 1-9) of the fixing seat 21 of the electric direction control assembly 20 drives the movable sheet 22 to rotate, and the movable sheet 22 actuates the connection plate 30 to revolve, hence the first contacting portion 31 and the first reflector lens 40 are adjustably rotated, and the first reflector lens 40 is adjusted to the desired angle in an electric driving manner.

Figure 7:
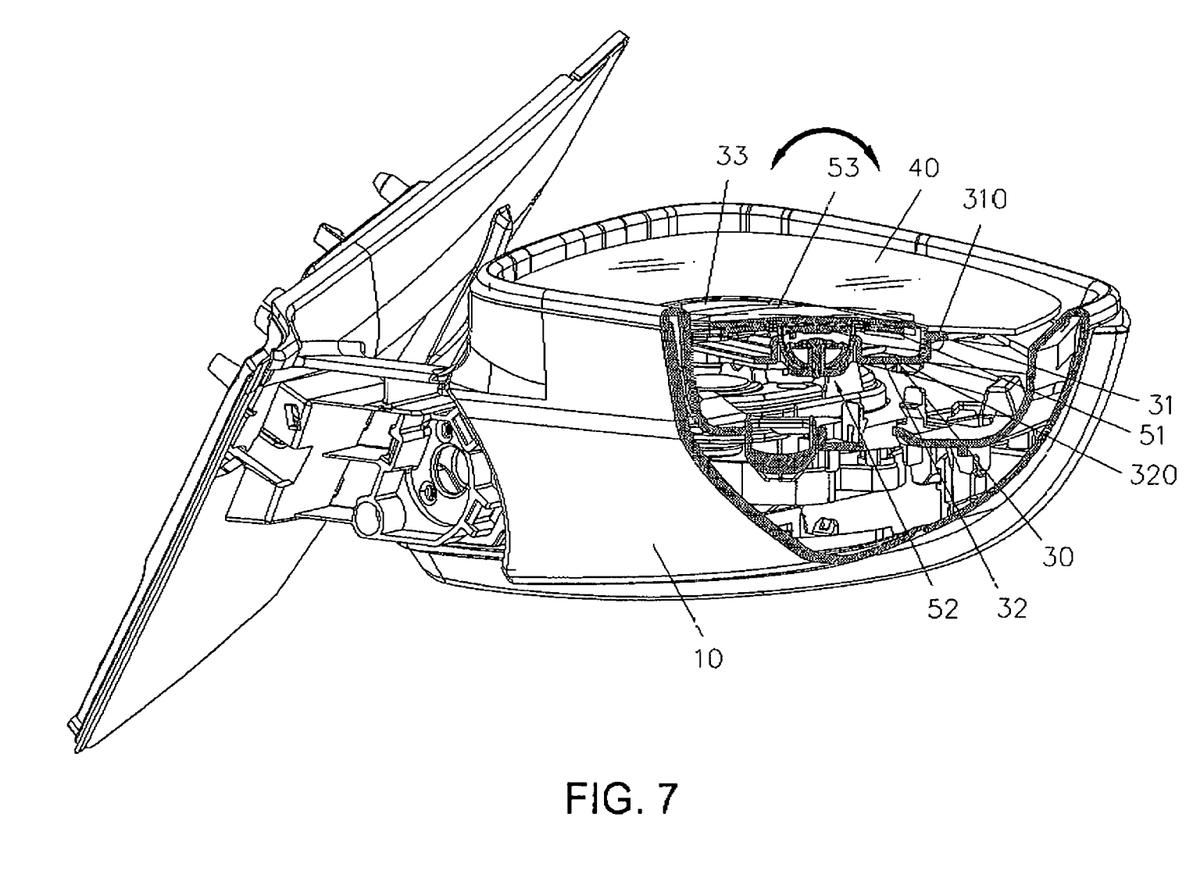
FIG. 7 is another perspective cross-sectional view showing the operation of the vehicle side mirror according to the first embodiment of the present invention.

As adjusting the second reflector lens 53 to the desired angle, as shown in FIG. 7, the universal connector 52 drives the second reflector lens 53 and the second contacting portion 51 to rotate so that the second reflector lens 53 is adjusted to the desired angle, wherein another electric direction control assembly is additionally arranged on the reflector lens assembly 50 so that the universal connector 52 is electrically driven to adjust an angle of the second reflector lens 53.

Figure 8:
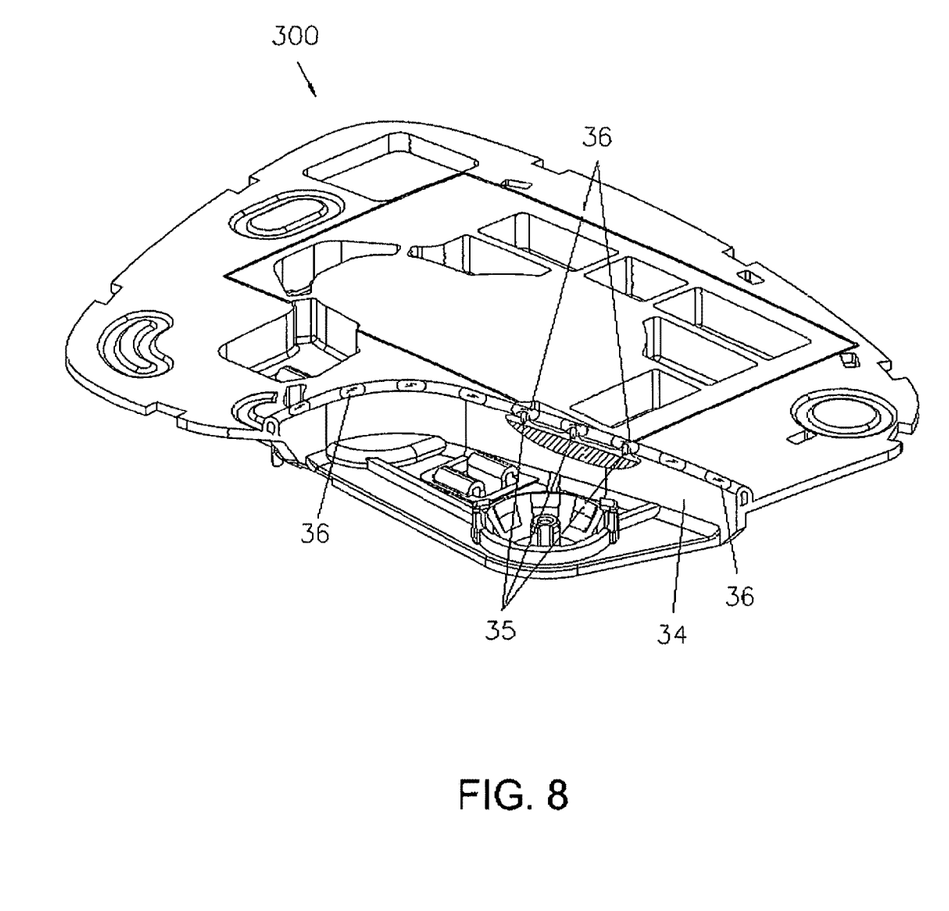
FIG. 8 is a perspective view of a connection plate of a vehicle side mirror according to a second embodiment of the present invention.
Figure 9:
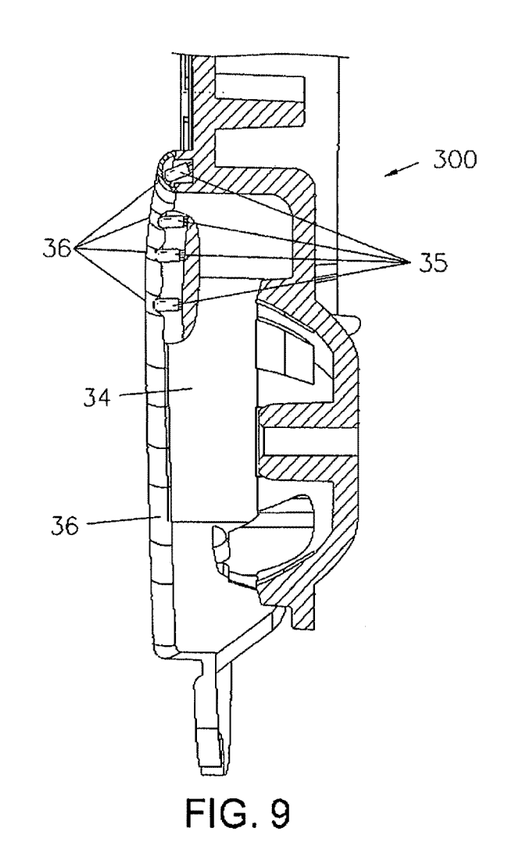
FIG. 9 is a cross sectional view of a part of the connection plate of the vehicle side mirror according to the second embodiment of the present invention.

With reference to FIGS. 8 and 9, a difference of a vehicle side mirror of a second embodiment from that of the first embodiment comprises: a stop fringe 34 having multiple light sources 35 exposing outside the stop fringe 34, wherein each of the multiple light sources 35 is an LED light bulb, and the stop fringe 34 has multiple lightshades 36 mounted on a top face thereof, wherein each of the multiple lightshades 36 is fixed on each light source 35 so as to project lights from each light source 35. In another embodiment, each lightshade 36 is in a strip shape and covers on the top face of the stop fringe 34, wherein a projecting angle between each light source 35 and a connection plate 30 is 15 degrees to 45 degrees so that the lights do not project user's eyes. In a preferred embodiment, each light source 35 illuminates lights to two sides of the vehicle distinguishingly so as to enhance driving safety, as reversing the vehicle.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A vehicle side mirror being mounted in an accommodation casing of a vehicle and comprising:
    an electric direction control assembly including a fixing seat and a movable sheet, and the movable sheet being fixed on the fixing seat and being adjustably rotated to a desired angle;
    a connection plate disposed on one surface of the movable sheet away from the fixing seat, and the connection plate including a first contacting portion and a coupling portion arranged on one side thereof, the first contacting portion having a first plane formed on one surface of the first contacting portion away from the electric direction control assembly, and the coupling portion having a second plane formed on one surface of the coupling portion away from the electric direction control assembly, the connection plate further including one surface facing the electric direction control assembly, and the second plane being lower than the first plane;
    a first reflector lens secured on the first plane of the first contacting portion; and
    a reflector lens assembly including a second contacting portion, a universal connector, and a second reflector lens, wherein the second contacting portion is connected with the coupling portion of the connection plate by way of the universal connector, the second contacting portion has a third plane formed on one surface thereof away from the coupling portion, and the second reflector lens is fixed on the third plane of the second contacting portion.

2. The vehicle side mirror as claimed in claim 1, wherein the first contacting portion is integrally injection molded with the coupling portion.

3. The vehicle side mirror as claimed in claim 1, wherein between the first contacting portion and the coupling portion is defined a stop fringe which connects with the first contacting portion and the coupling portion.

4. The vehicle side mirror as claimed in claim 3, wherein the stop fringe has a top face formed on one surface thereof away from the electric direction control assembly, the connection plate further includes the one surface facing the electric direction control assembly, and the first plane of the first contacting portion is lower than the top face of the stop fringe.

5. The vehicle side mirror as claimed in claim 3, wherein the stop fringe has a top face formed on one surface thereof away from the electric direction control assembly, and the stop fringe has multiple light sources exposing outside the top face of the stop fringe.

6. The vehicle side mirror as claimed in claim 5, wherein each of the multiple light sources is an LED light bulb.

7. The vehicle side mirror as claimed in claim 5, wherein a projecting angle between each light source and the connection plate is 15 degrees to 45 degrees.

8. The vehicle side mirror as claimed in claim 5, wherein the stop fringe has multiple lightshades mounted on the top face thereof, wherein each of the multiple lightshades is fixed on each light source.

9. The vehicle side mirror as claimed in claim 8, wherein each lightshade is in a strip shape and covers the top face of the stop fringe.

10. The vehicle side mirror as claimed in claim 1, wherein another electric direction control assembly is arranged on the reflector lens assembly so that the universal connector is electrically driven to adjust an angle of the second reflector lens.

\* \* \* \* \*